(12) United States Patent
Gomez Bravo Manzo et al.

(10) Patent No.: US 11,648,823 B2
(45) Date of Patent: May 16, 2023

(54) ADJUSTABLE VANES FOR VEHICLE NOZZLES

(71) Applicant: GM GLOBAL TECHNOLOGY OPERATIONS LLC, Detroit, MI (US)

(72) Inventors: Enrique Gomez Bravo Manzo, Royal Oak, MI (US); Gerard A. Brinas, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 45 days.

(21) Appl. No.: 17/189,369

(22) Filed: Mar. 2, 2021

(65) Prior Publication Data

US 2022/0281292 A1 Sep. 8, 2022

(51) Int. Cl.
*B60H 1/34* (2006.01)
(52) U.S. Cl.
CPC ... *B60H 1/3421* (2013.01); *B60H 2001/3471* (2013.01)
(58) Field of Classification Search
CPC .......... B60H 1/3421; B60H 2001/3464; B60H 1/345; B60H 1/34; B60S 1/023
See application file for complete search history.

(56) References Cited

U.S. PATENT DOCUMENTS

| | | | | |
|---|---|---|---|---|
| 4,864,919 A * | 9/1989 | Schulz | ................. | F24F 13/072 454/127 |
| 5,063,833 A | 11/1991 | Hara et al. | | |
| 5,113,748 A * | 5/1992 | Shibuya | ................. | B60H 1/242 454/127 |
| 5,176,571 A * | 1/1993 | Fujihara | ................. | F24F 13/15 454/285 |
| 5,238,448 A * | 8/1993 | Komori | ................. | B60H 1/34 454/155 |
| 2007/0060040 A1* | 3/2007 | Ogura | ................. | B60H 1/3421 454/319 |
| 2007/0232216 A1* | 10/2007 | Shibata | ................. | B60H 1/3421 454/155 |
| 2017/0057325 A1* | 3/2017 | Brinas | ................. | B60H 1/3421 |
| 2017/0361683 A1* | 12/2017 | Brinas | ................. | B60H 1/00871 |
| 2018/0304725 A1* | 10/2018 | Araujo Nieto | ....... | B60H 1/3421 |

FOREIGN PATENT DOCUMENTS

| | | | |
|---|---|---|---|
| DE | 202018102104 U1 | 4/2018 | |
| GB | 2504556 A * | 2/2014 | .......... B60H 1/3421 |
| JP | H072264 Y2 | 1/1995 | |
| JP | 2017149299 A | 8/2017 | |

OTHER PUBLICATIONS

Office Action dated Jul. 20, 2022 from German Patent Office for German Patent Application No. 102021131167.5; 4 Pages.

\* cited by examiner

*Primary Examiner* — Edelmira Bosques
*Assistant Examiner* — Michael James Giordano

(57) ABSTRACT

A nozzle to output air onto an interior surface of a windshield of a vehicle is includes: a housing including: a first opening configured to receive air output by a blower; a second opening to output air toward the interior surface of the windshield; N sets of tracks formed in the housing, where N is an integer greater than 1; N vanes that are flexible and that each slide along a respective one of the N sets of tracks; and an actuator that is coupled to each of the N vanes and that is configured to slide along the N vanes along the N sets of tracks, respectively.

19 Claims, 23 Drawing Sheets

ADJUSTABLE VANES FOR VEHICLE NOZZLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to heating ventilation and air conditioning (HVAC) systems of vehicles and more particularly to adjustable vanes configured to output air from an HVAC system of a vehicle onto a windshield.

A HVAC system of a vehicle includes two or more heat exchangers used to provide heating and cooling of a passenger cabin of the vehicle. The HVAC system may also be used to defrost a windshield of the vehicle and to defog an interior surface of the windshield.

A refrigerant pump may pump cool refrigerant to one heat exchanger. A blower of the HVAC system may increase airflow past this heat exchanger to cool the air within the passenger cabin. The blower may increase airflow past a second heat exchanger to warm air within the passenger cabin. The second heat exchanger may, for example, receive warm engine coolant from an engine. Alternatively, heat may be generated for the second heat exchanger via electrical power.

SUMMARY

In a feature, a nozzle to output air onto an interior surface of a windshield of a vehicle is described. The nozzle includes: a housing including: a first surface; a second surface that is opposite the first surface; a first opening configured to receive air output by a blower; a second opening to output air toward the interior surface of the windshield; first and second tracks formed on the first surface; third and fourth tracks formed on the second surface; a vane that is flexible and that includes first, second, third, and fourth extensions, where the first and second extensions extend into and slide along the first and second tracks, and where the third and fourth extensions extend into and slide along the third and fourth tracks; and an actuator that is coupled to at least one of the first, second, third, and fourth extensions and that is configured to, via moving the at least one of the first second, third, and fourth extensions: slide the first and second extensions along the first and second tracks; and slide the third and fourth extensions along the third and fourth tracks.

In further features, the nozzle further includes: fifth and sixth tracks formed on the first surface; seventh and eighth tracks formed on the second surface; a second vane that is flexible and that includes fifth, sixth, seventh, and eighth extensions, where the fifth and sixth extensions extend into and slide along the fifth and sixth tracks, and where the seventh and eighth extensions extend into and slide along the seventh and eighth tracks, where the actuator is further coupled to at least one of the fifth, sixth, seventh, and eighth extensions and is further configured to, via moving the at least one of the fifth, sixth, seventh, and eighth extensions: slide the fifth and sixth extensions along the fifth and sixth tracks; and slide the seventh and eighth extensions along the seventh and eighth tracks.

In further features, the vane and the second vane include rubber.

In further features, the actuator is configured to simultaneously move both: the at least one of the first, second, third, and fourth extensions and (b) the at least one of the fifth, sixth, seventh, and eighth extensions.

In further features, a first length of the vane is different than a second length of the second vane.

In further features, the actuator includes an electric motor.

In further features, the actuator further includes an arm that is coupled at a first end to the least one of the first, second, third, and fourth extensions, where the electric motor is configured to move the at least one of the first, second, third, and fourth extensions via moving the arm.

In further features, the actuator further includes a gear and a lever arm including teeth that are meshed with the teeth of the gear, where the motor is configured to drive rotation of the gear and the lever arm, and where the lever arm is coupled to a second end of the arm.

In further features, the vane has a rectangular prism shape.

In further features, the first, second, third, and fourth extensions extend outwardly away from side surfaces of the vane.

In further features, the first, second, third and fourth tracks are arcuate.

In further features, the housing has a trapezoidal prism shape and an area of the first opening is less than an area of the second opening.

In further features, the first, second, third, and fourth tracks include apertures through the housing.

In further features, the nozzle further includes: N additional vanes that are flexible and that each include a set of four extensions, where N is an integer greater than or equal to two; N sets of four tracks, where a first two of each set of four tracks are formed on the second surface and a second two of each set of four tracks are formed on the first surface, where the four extensions of each vane extend into and slide along ones of tracks the set of four tracks of that vane.

In further features, the actuator is configured to selectively: actuate the vane to a fully open position; and actuate the vane to a fully closed position.

In further features, the actuator is configured to selectively actuate the vane to a position between the fully open position and the fully closed position.

In further features, the actuator is configured to selectively actuate the vane to multiple different positions between the fully open position and the fully closed position.

In further features, the actuator is configured to selectively oscillate the vane back and forth between two positions.

In further features, the vane is configured to: output air into the interior surface of the windshield in a first direction when the vane is in a first position; output air into the interior surface of the windshield in a second direction when the vane is in a second position; and output air into the interior surface of the windshield in a third direction when the vane is in a third position.

In a feature, a nozzle to output air onto an interior surface of a windshield of a vehicle is described. The nozzle includes: a housing including: a first opening configured to receive air output by a blower; a second opening to output air toward the interior surface of the windshield; N sets of tracks formed in the housing, where N is an integer greater than 1; N vanes that are flexible and that each slide along a respective one of the N sets of tracks; and an actuator that is coupled to each of the N vanes and that is configured to slide along the N vanes along the N sets of tracks, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Heating ventilation and air conditioning (HVAC) system defroster ducts and grills of vehicles may include fixed vanes. A blower of the HVAC system blows air through the ducts, the vanes, and grills onto a front windshield of the vehicle.

Fixed vanes, however, may only output air from the HVAC system onto limited and specific areas of the windshield. This may defrost/defog those areas of the windshield quickly, while other areas of the windshield may be slower to defrost/defog. The fixed vanes may also be less aesthetically/visually pleasing.

The present application involves a nozzle including adjustable airfoiled vanes that direct airflow from the blower to different portions of the windshield. The vanes can be adjusted during use, for example, to clear different areas of the windshield and/or clear the entire windshield faster than possible with fixed vanes. The adjustable vanes may also be closable, such as to provide the appearance of a solid surface when the vanes are closed. The adjustable vanes may also be more aesthetically/visually pleasing than fixed vanes.

Figure 1:
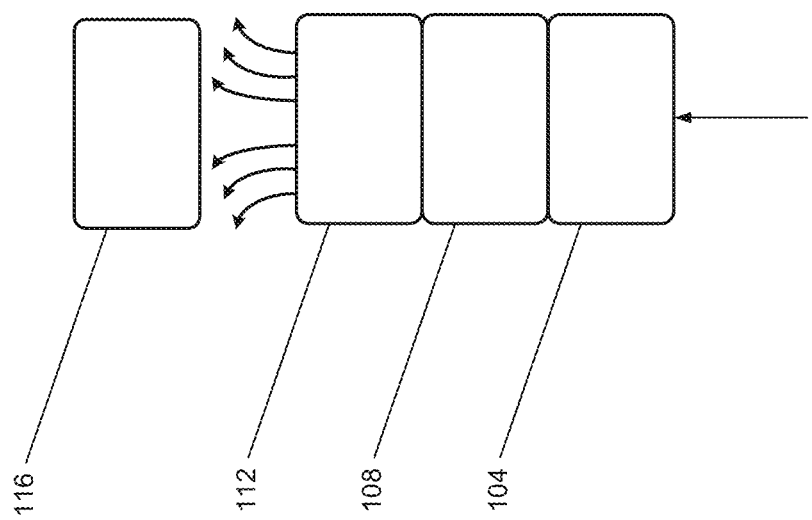
FIG. 1 is a functional block diagram of an example portion of a heating ventilation and air conditioning (HVAC) system of a vehicle.

FIG. 1 is a functional block diagram of an example portion of an HVAC system of a vehicle. A blower 104 blows air into a duct 108. The blower 104 may draw air, for example, from an engine compartment of the vehicle, from a passenger cabin of the vehicle, and/or another suitable location.

The duct is fluidly coupled to a nozzle 112. Air output from the nozzle 112 flows onto a windshield 116, such as a front windshield of a vehicle or a rear windshield of the vehicle. While the example of a windshield is provided, the present application is also applicable to other glass, such as windows, etc.

Vanes of the nozzle 112 control airflow toward the windshield 116, as discussed further below. The HVAC system may include other components that are not shown, such as one or more actuators configured to adjust where air is drawn from and where it is output to, ducts, two or more heat exchangers (e.g., one for cooling and one for heating), and/or one or more other components.

Figure 2:
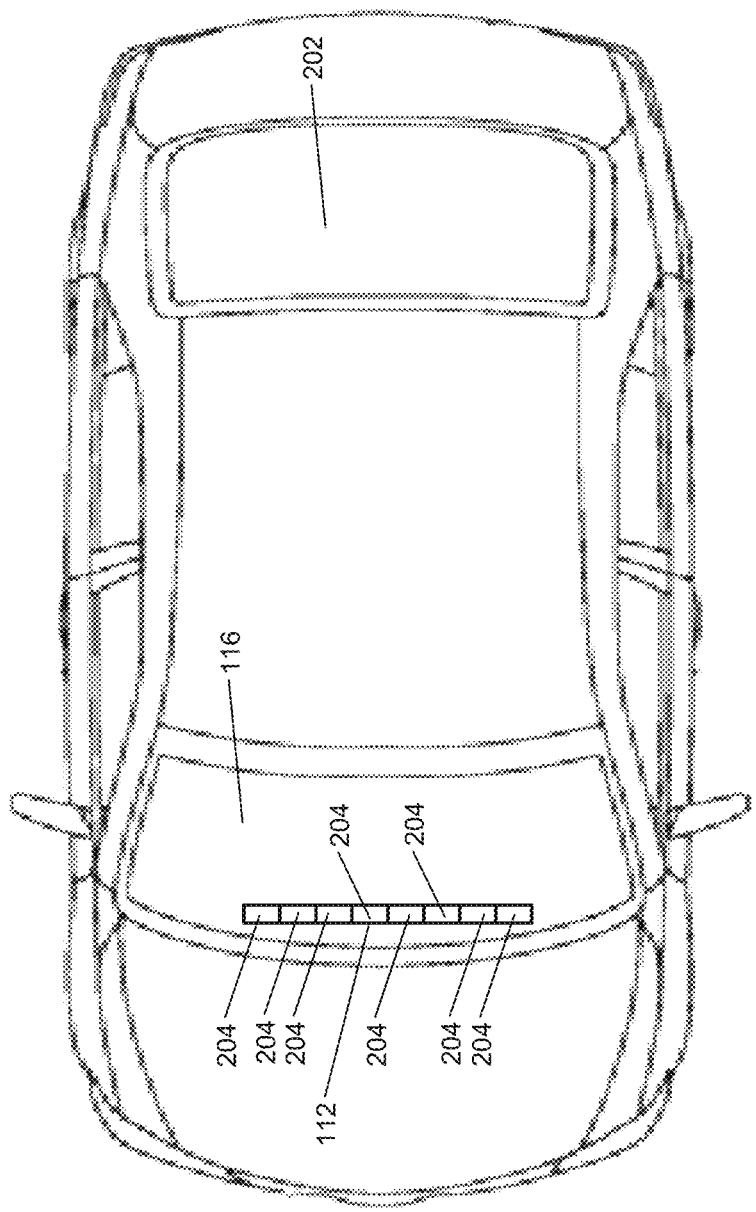
FIG. 2 is a top view of an example vehicle.

FIG. 2 is a top view of an example vehicle including the (front) windshield 116. The vehicle also includes a rear windshield 202. While the example of the windshield 116 will be discussed below, the present application is also applicable to the rear windshield 202.

As discussed above, vanes 204 of the nozzle 112 control airflow toward the windshield 116. The vanes 204 are shown in a fully closed position in the example of FIG. 2. As discussed further below, however, the vanes 204 are adjustable between a fully open position and the fully closed position, inclusive. Also, while the example of eight vanes is provided and will be discussed, the nozzle 112 may include a greater or lesser number of vanes.

Figure 3:
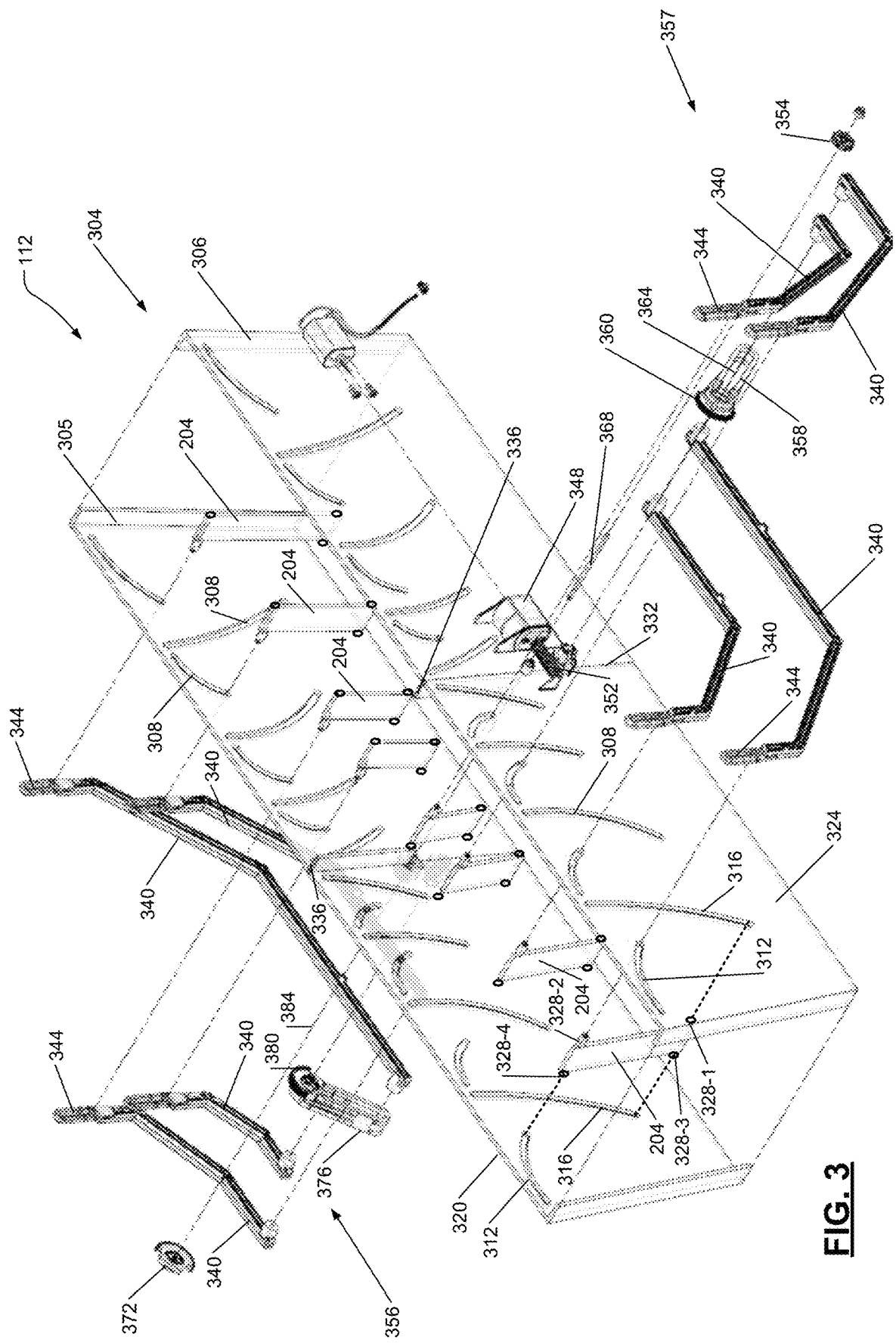
FIG. 3 is a perspective exploded view of an example implementation of a nozzle including adjustable vanes.

FIG. 3 is a perspective exploded view of an example implementation of the nozzle 112. The vanes 204 are disposed within a housing 304, such as rectangular prism shaped housing or a trapezoidal prism shaped housing. The housing 304 may be a two-piece housing as shown including a first piece 305 and a second piece 306. Alternatively, the housing 304 may be a single piece or more than two pieces.

The housing 304 includes pairs of tracks 308 for the vanes 204, respectively. Each pair of tracks includes a first track, such as first track 312 and a second track 316. The first and second tracks 312 and 316 of each pair of tracks may each be arcuate, such as shown.

Each of the vanes 204 may be associated with two pairs of the tracks 308, such as one pair of tracks located on a first surface 320 of the housing 304 and a second pair of tracks located on a second surface 324 of the housing 304. The first surface 320 is opposite the second surface 324.

Each track includes a recess (e.g., groove) in an interior surface of the associated one of the first and second surfaces (or components) 320 and 324 or an aperture through the associated one of the first and second surfaces 320 and 324. In various implementations, both recesses and apertures may be included. For example, apertures may be used to connect to actuators, as discussed further below.

Figure 4B:
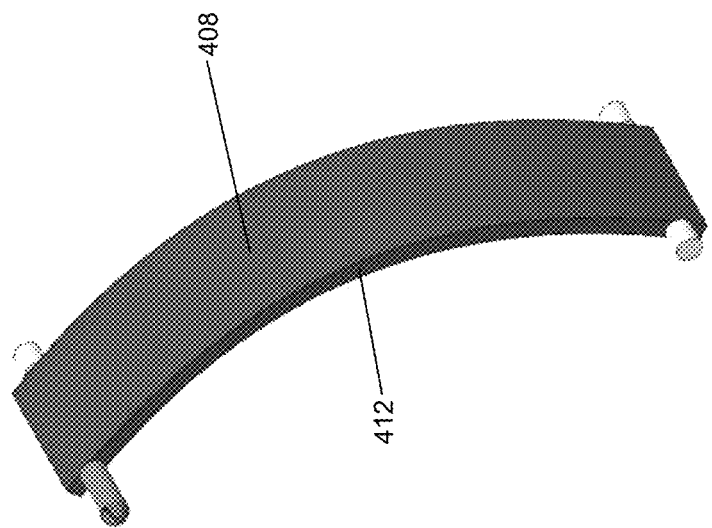
FIGS. 4A-4B are perspective views of example implementations of the vanes.
Figure 4A:
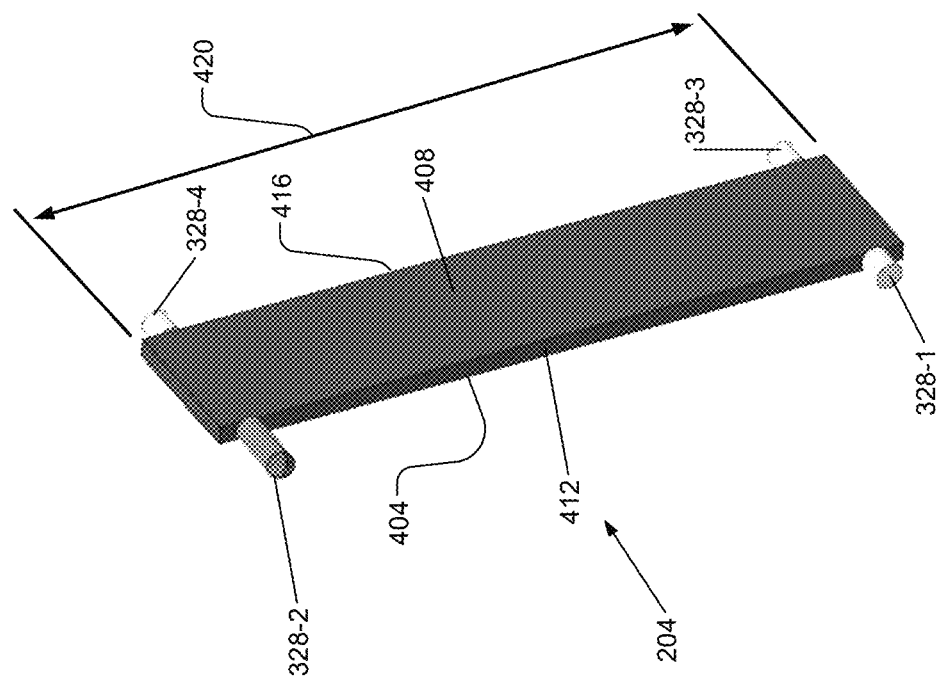

Each of the vanes 204 includes four extensions 328, such as extensions 328-1, 328-2, 328-3, and 328-4. FIGS. 4A and 4B include an example perspective view of one of the vanes 204 when in a fully open position and when in a closed (e.g., partially) position. Each of the vanes 204 includes a first surface 404 and a second surface 408 that is opposite the first surface 404. Each of the vanes 204 also includes a first lateral side 412 and a second lateral side 416 that is opposite the first lateral side 412.

The extensions extend (e.g., perpendicularly) outwardly from the first and second lateral surfaces 412 and 416. For example, the extensions 328-1 and 328-2 extend outwardly from the first lateral side 412, and the extensions 328-3 and 328-4 extend outwardly from the second lateral side 416. The extensions 328 may be cylindrical or have another suitable shape.

The extensions 328 may also be referred to as pins. The extensions 328 may be made of a rigid material, such as a plastic, nylon, or another suitable material. The body of the vanes 204 defined by the first and second surfaces 404 and 408 and the first and second lateral sides 412 and 416 may include a flexible material, such as rubber or another suitable material. The body of the vanes 204 may also include one or more other materials, such as a plastic. The body of the vanes 204 may be, for example, formed via a two shot process including plastic and rubber.

The body of the vanes 204 may be rectangular prism (cuboid) when in the fully open position, such as shown in the example of FIG. 4A. The body of the vanes 204 may form an arcuate rectangular prism when the vanes 204 are in partially and fully closed positions, such as illustrated in the example of FIG. 4B.

Referring to FIGS. 3, 4A, and 4B, the vanes 204 may have different sizes, such as lengths 420 (and therefore areas) of their respective first and second surfaces 404 and 408. For example, as shown in FIG. 3, ones of the vanes 204 located closer to a horizontal centerline 332 may have a shorter length than ones of the vanes 204 located further from the horizontal centerline 332. The lengths of the vanes 204 may increase moving horizontally away from the horizontal centerline 332. While the example of different length vanes is provided, the present application is also applicable to vanes of the same length. In various implementations, the housing 304 may include a center divider 336 at the horizontal centerline 332 to divide the vanes 204 into two sets of vanes, such as a first set of vanes for a left half of the windshield and a second set of vanes for a right half of the windshield.

The vanes 204 may be within a predetermined range of the horizontal centerline 332 when in the fully open position. The predetermined range may be, for example, 0-10 degrees in various implementations. When the vanes 204 are in the fully closed position, the vanes 204 may be co-planar and all lie on horizontal plane (i.e., be 0 degrees from horizontal).

As shown in FIG. 3, two of the extensions 328 of each vane extend into and slide along associated ones of the tracks 308 on the first surface 320 of the housing 304, and the other two of the extensions of each vane extend into and slide along associated ones of the tracks 308 on the second surface 324 of the housing 304. For example, the extension 328-4 extends into and slides along the track 312 on the first surface 320, and the extension 328-2 extends into and slides along the track 312 in the second surface 324. The extension 328-3 extends into and slides along the track 316 on the first surface 320, and the extension 328-1 extends into and slides along the track 316 in the second surface 324.

An actuator selectively actuates the vanes 204 to the fully open position, the fully closed position, and one or more positions between the fully open and closed positions via arms 340. The arms 340 may be L-shaped and extend both horizontally away from the horizontal centerline 332 and vertically toward the windshield 116.

The arms 340 include apertures 344, and ones of the extensions extend through the apertures 344 in the arms 340. In various implementations, a first set 356 of the arms 340 may be disposed adjacent to the first piece 305 of the housing 304. Extensions 328-4 of the first set of vanes 204 (e.g., for the right half of the windshield 116) extend into the apertures 344 of the first set 356 of arms 340. The first set of vanes 204 is actuated by the first set 356 of arms 340, respectively. A second set 357 of the arms 340 may be disposed adjacent to the second piece 306 of the housing 304. Extensions 328-1 of the second set of vanes 204 (e.g., for the left half of the windshield 116) extend into the apertures 344 of the second set 357 of arms 340. The second set of vanes 204 is actuated by the second set 357 of arms 340, respectively.

In the example of FIG. 3, the arms 340 move the vanes 204 between the fully open and closed positions via a motor 348. The motor 348 may be, for example, a stepper motor or another suitable type of electric motor.

Rotation of an output shaft of the motor 348 causes rotation of a worm gear 352. The worm gear 352 is meshed with a first transfer gear 354. Rotation of the worm gear 352 in a first direction drives rotation of the first transfer gear 354 in a second direction. Rotation of the worm gear 352 in a third direction that is opposite the first direction drives rotation of the first transfer gear 354 in a fourth direction that is opposite the second direction.

Figure 20:
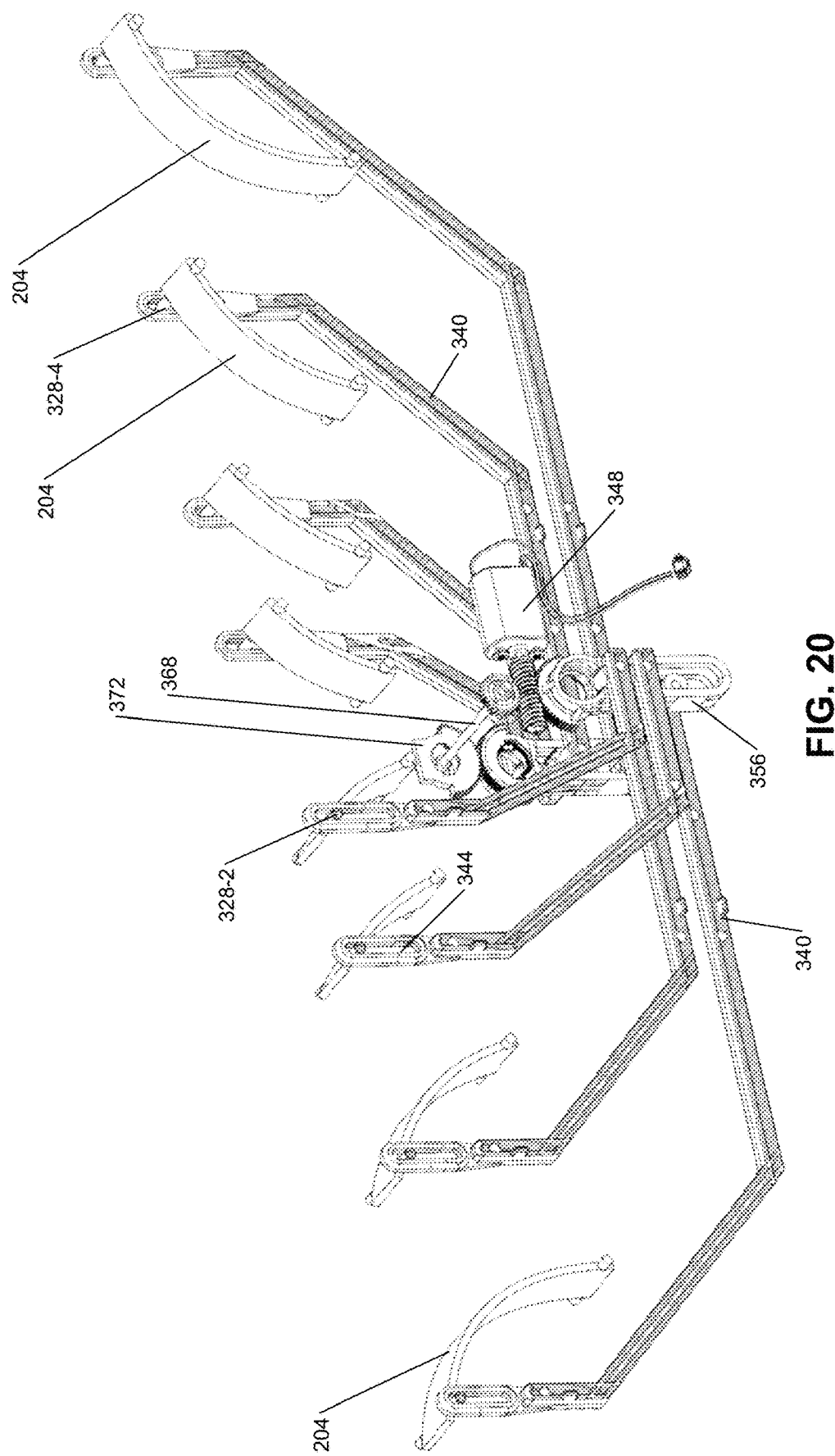
FIG. 20 is a perspective view of the nozzle without the housing looking toward the second side of the housing when the vanes are in the partially open position.
Figure 21:
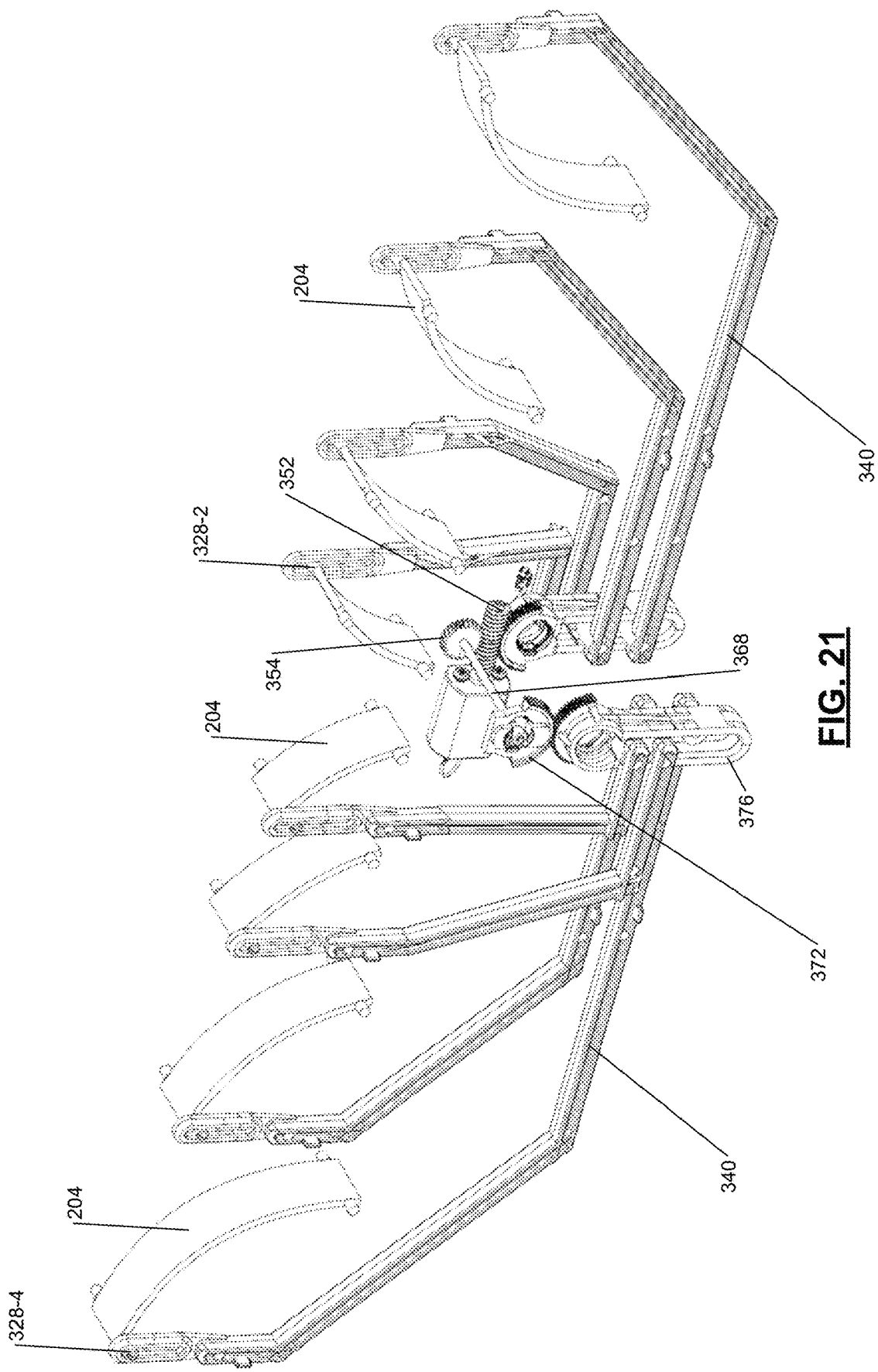
FIG. 21 is a perspective view of the nozzle without the housing looking toward the first side of the housing when the vanes are in the partially open position.

The second set 357 of arms 340 are connected to a first lever arm 358. As shown in FIGS. 20 and 21, a first half of the second set 357 of arms 340 may connect to an interior side of the first lever arm 358, and a second half of the second set 357 of arms 340 may connect to an exterior side of the first lever arm 358. This may minimize packaging space.

The first lever arm 358 includes first teeth 360 that mesh with the teeth of the first transfer gear 354. Rotation of the first transfer gear 354 in clockwise drives rotation of the first lever arm 358 counterclockwise about an axis 364. Rotation of the first transfer gear 354 counterclockwise drives rotation of the first lever arm 358 clockwise about the axis 364. As used herein, clockwise, counterclockwise, and other directions of translation may be described from the perspective of looking at the rotating component from its side of the housing 304.

Rotation of the first lever arm 358 in counterclockwise translates the second set 357 of arms 340 horizontally toward the horizontal centerline 332, thereby actuating the second set of vanes 204 toward or to the fully open position. Rotation of the first lever arm 358 in clockwise translates the second set 357 of arms 340 horizontally away the horizontal centerline 332, thereby actuating the second set of vanes 204 toward or to the fully closed position.

The first transfer gear 354 is coupled to a first end of a shaft 368. The first transfer gear 354 drives rotation of the shaft 368. The shaft 368 extends through the housing 304, and a second transfer gear 372 is coupled to a second end of the shaft 368. Rotation of the first transfer gear 354 counterclockwise when viewing the first transfer gear 354 drives rotation of the second transfer gear 372 clockwise when viewing the second transfer gear 372. Rotation of the first transfer gear 354 clockwise when viewing the first transfer gear 354 drives rotation of the second transfer gear 372 counterclockwise when viewing the second transfer gear 372.

The first set 356 of arms 340 are connected to a second lever arm 376. As shown in FIGS. 20 and 21, a first half of the first set 356 of arms 340 may connect to an interior side of the second lever arm 376, and a second half of the first set 356 of arms 340 may connect to an exterior side of the second lever arm 376. This may minimize packaging space.

The second lever arm 376 includes second teeth 380 that mesh with the teeth of the second transfer gear 372. Rotation of the second transfer gear 372 counterclockwise drives rotation of the second lever arm 376 clockwise about an axis 384. Rotation of the second transfer gear 372 counterclockwise drives rotation of the second lever arm 376 clockwise about the axis 384.

Rotation of the second lever arm 376 counterclockwise translates the first set 356 of arms 340 horizontally toward the horizontal centerline 332, thereby actuating the first set of vanes 204 toward or to the fully open position. Rotation of the second lever arm 376 in clockwise translates the first set 356 of arms 340 horizontally away the horizontal centerline 332, thereby actuating the first set of vanes 204 toward or to the fully closed position.

In view of the above, the first and second sets of vanes 204 are closed at the same time via the motor 348 and are opened at the same time via the motor 348. While the example of the actuator including the motor 348 is provided, the motor 348 may be omitted, and the vanes 204 may be opened or closed manually, such as via a dial. For example, the vanes 204 may be positioned once by a vehicle manufacturer before sale of the vehicle and left unchanged thereafter.

Figure 5:
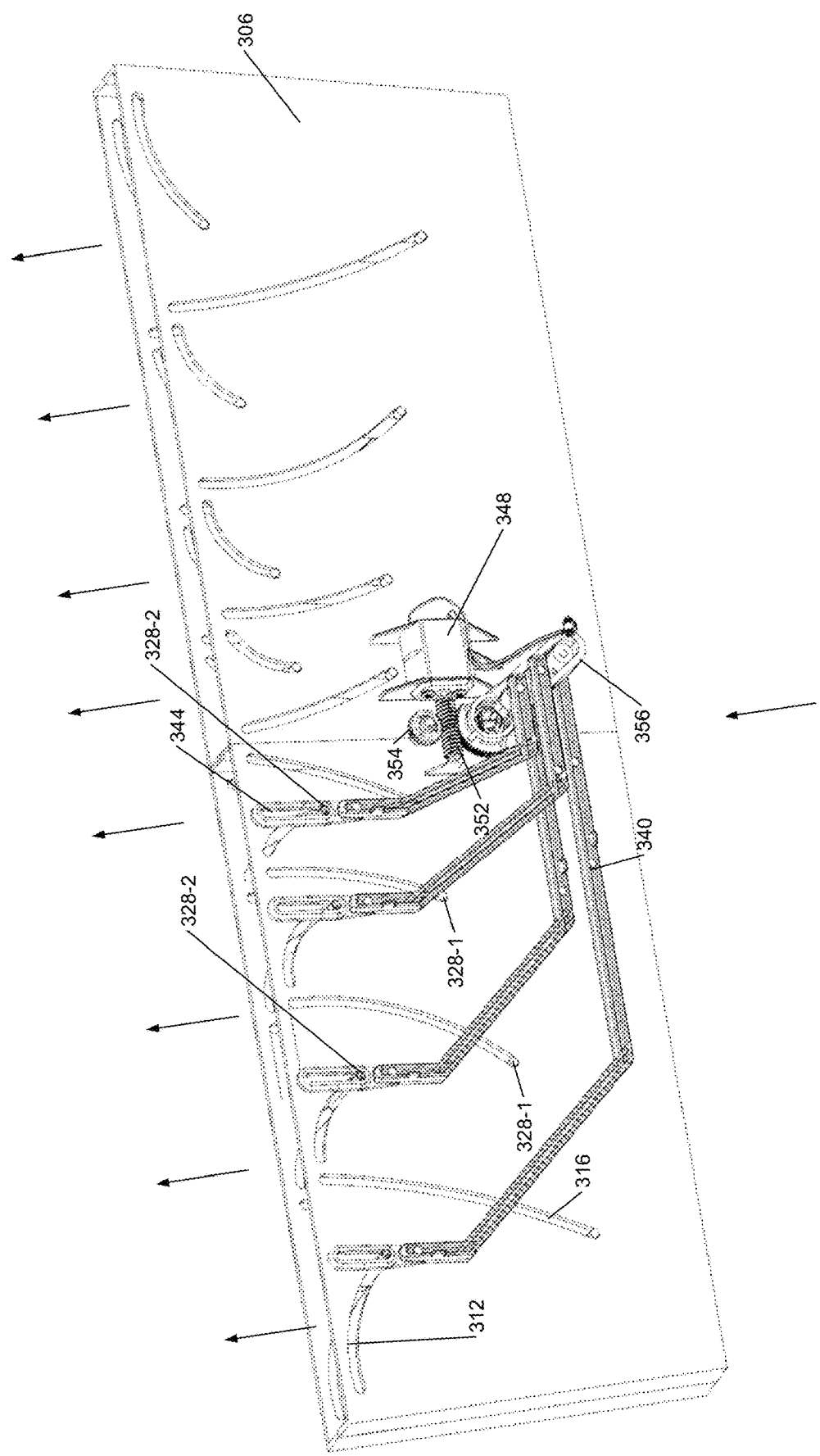
FIG. 5 is a perspective view of the nozzle toward the second side of the housing when the vanes are in the fully open position.
Figure 6:
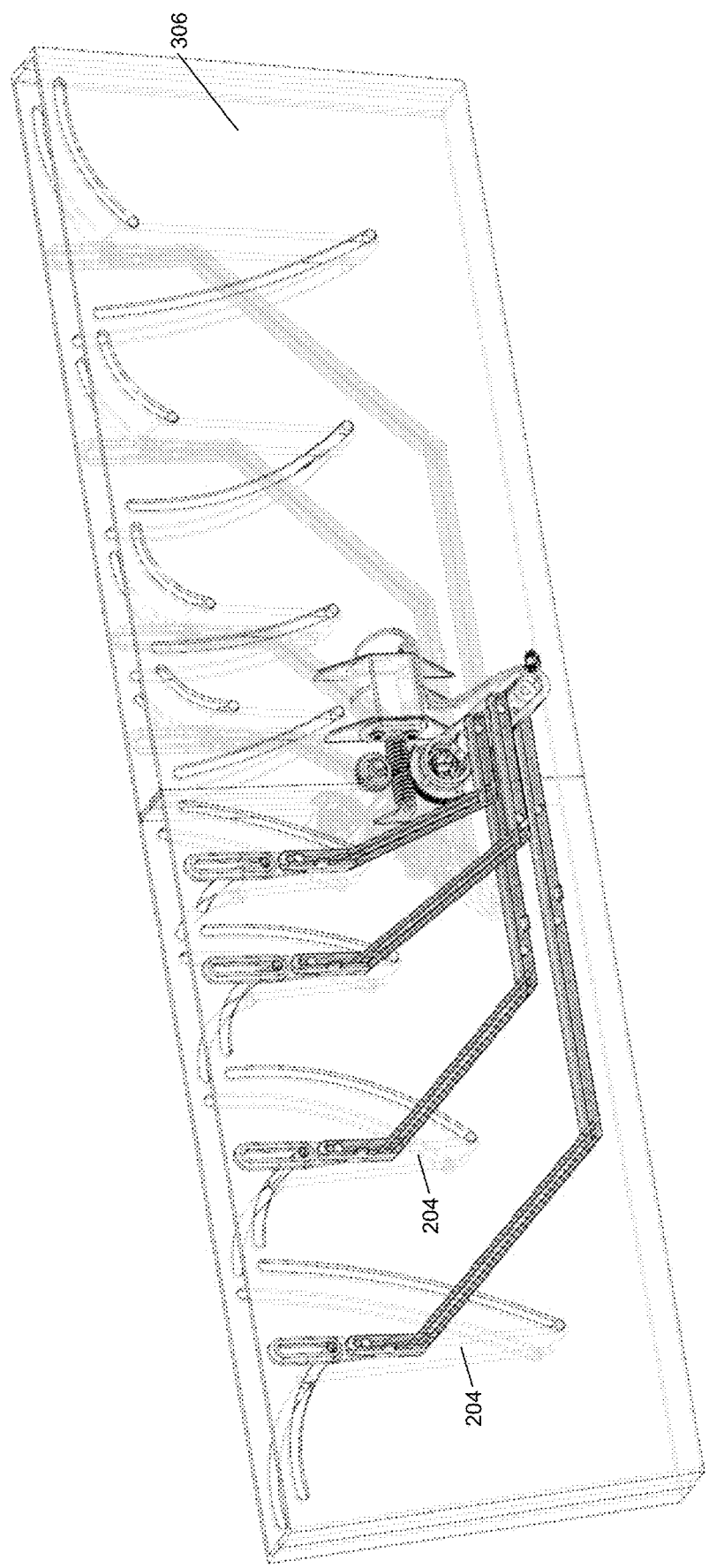
FIG. 6 is a perspective view of the nozzle toward the second side of the housing when the vanes are in the fully open position with components arranged adjacent to the first side of the housing and the vanes shown in phantom.
Figure 7:
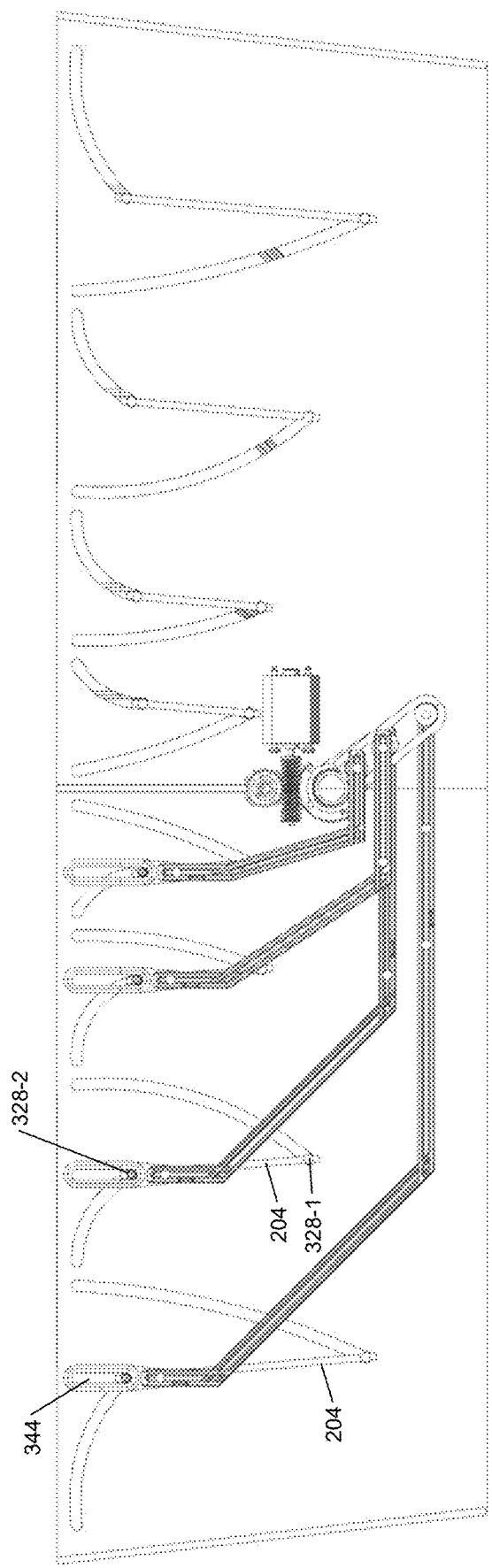
FIG. 7 is another perspective view of the nozzle toward the second side of the housing when the vanes are in the fully open position.
Figure 8:
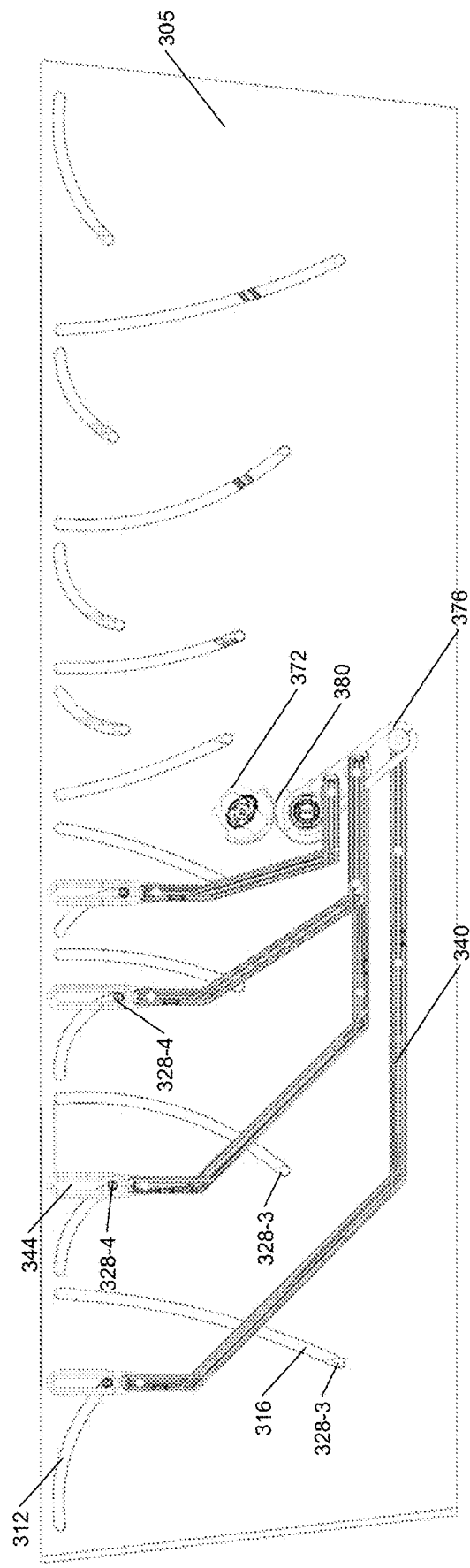
FIG. 8 is a perspective view of the nozzle toward the first side of the housing when the vanes are in the fully open position.
Figure 9:
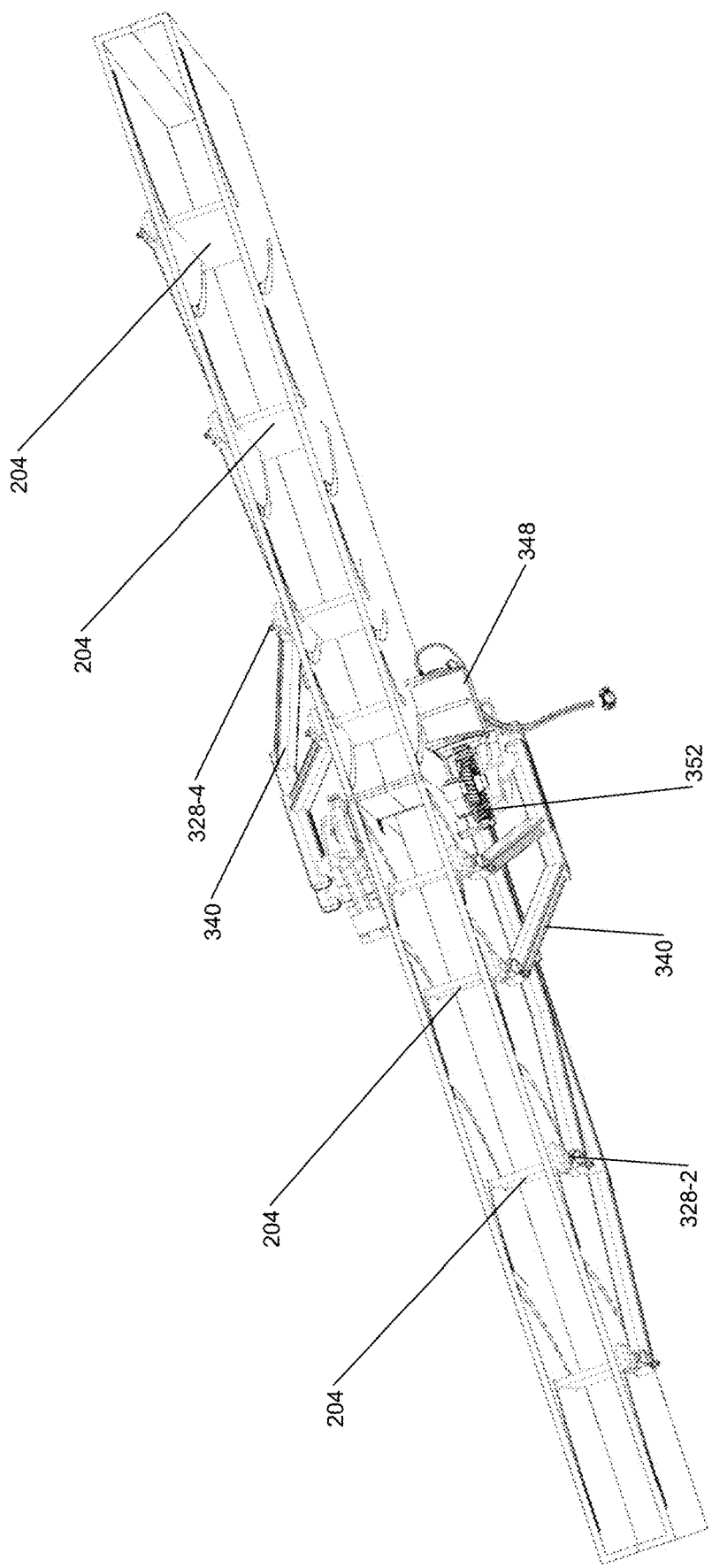
FIG. 9 is a top perspective view of the nozzle when the vanes are in the fully open position.

FIG. 5 is a perspective view of the nozzle 112 toward the second surface 324 of the housing 304 when the vanes 204 are in the fully open position. FIG. 6 is a perspective view of the nozzle 112 toward the second surface 324 of the housing 304 when the vanes 204 are in the fully open position with components arranged adjacent to the first surface 320 of the housing 304 and the vanes 204 shown in phantom. FIG. 7 is another perspective view of the nozzle 112 toward the second surface 324 of the housing 304 when the vanes 204 are in the fully open position. FIG. 8 is a perspective view of the nozzle 112 toward the first surface 320 of the housing 304 when the vanes 204 are in the fully open position. FIG. 9 is a top perspective view of the nozzle 112 when the vanes 204 are in the fully open position.

Figure 10:
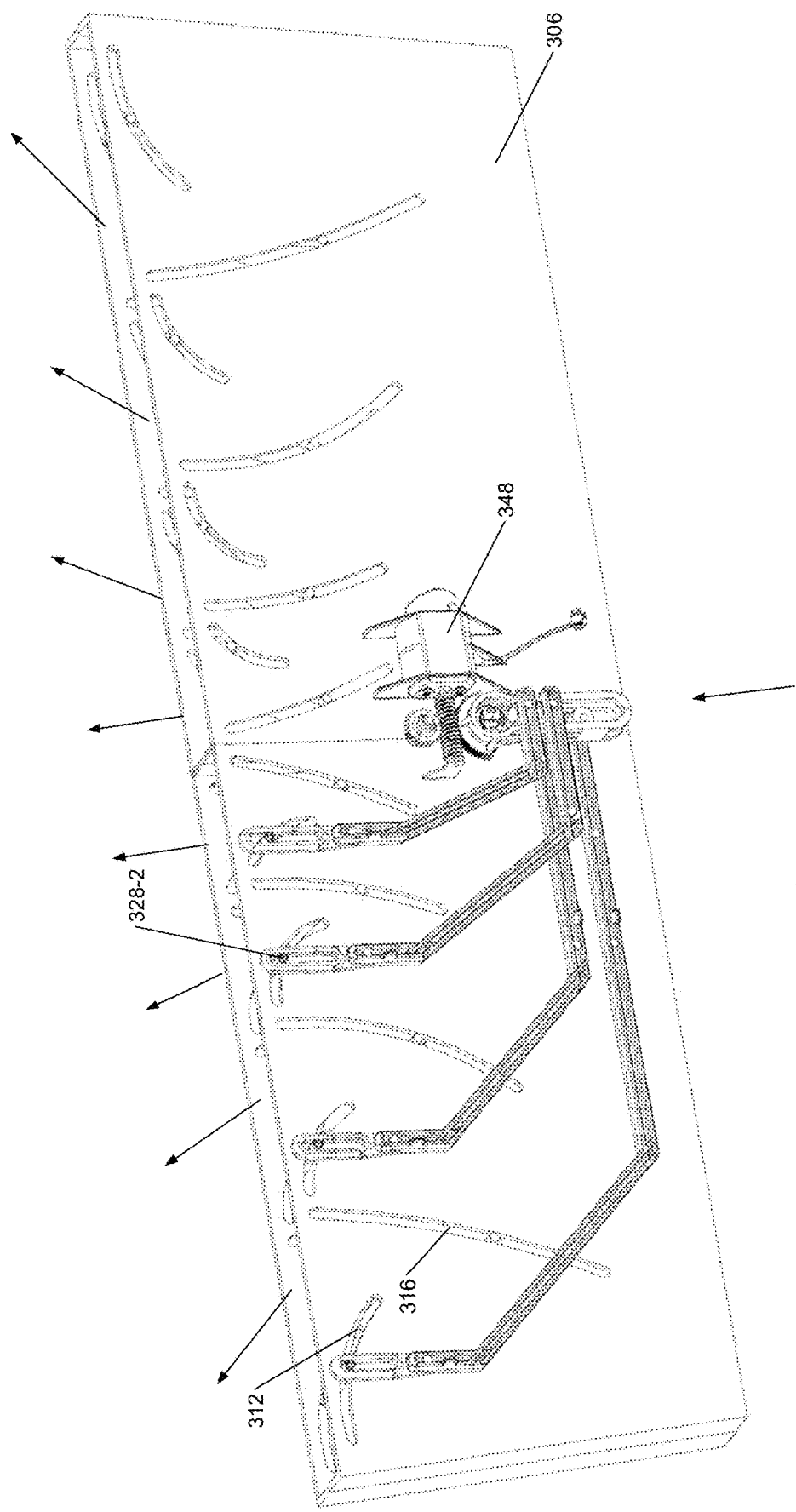
FIG. 10 is a perspective view of the nozzle toward the second side of the housing when the vanes are in a partially open position between the fully open position and the fully closed position.

FIG. 10 is a perspective view of the nozzle 112 toward the second surface 324 of the housing 304 when the vanes 204 are in a partially open position between the fully open position and the fully closed position. Partially opening the vanes 204 may provide more outboard airflow and may be useful for larger windshields. Use of a partially open position may increase airflow for low blower speeds.

Figure 11:
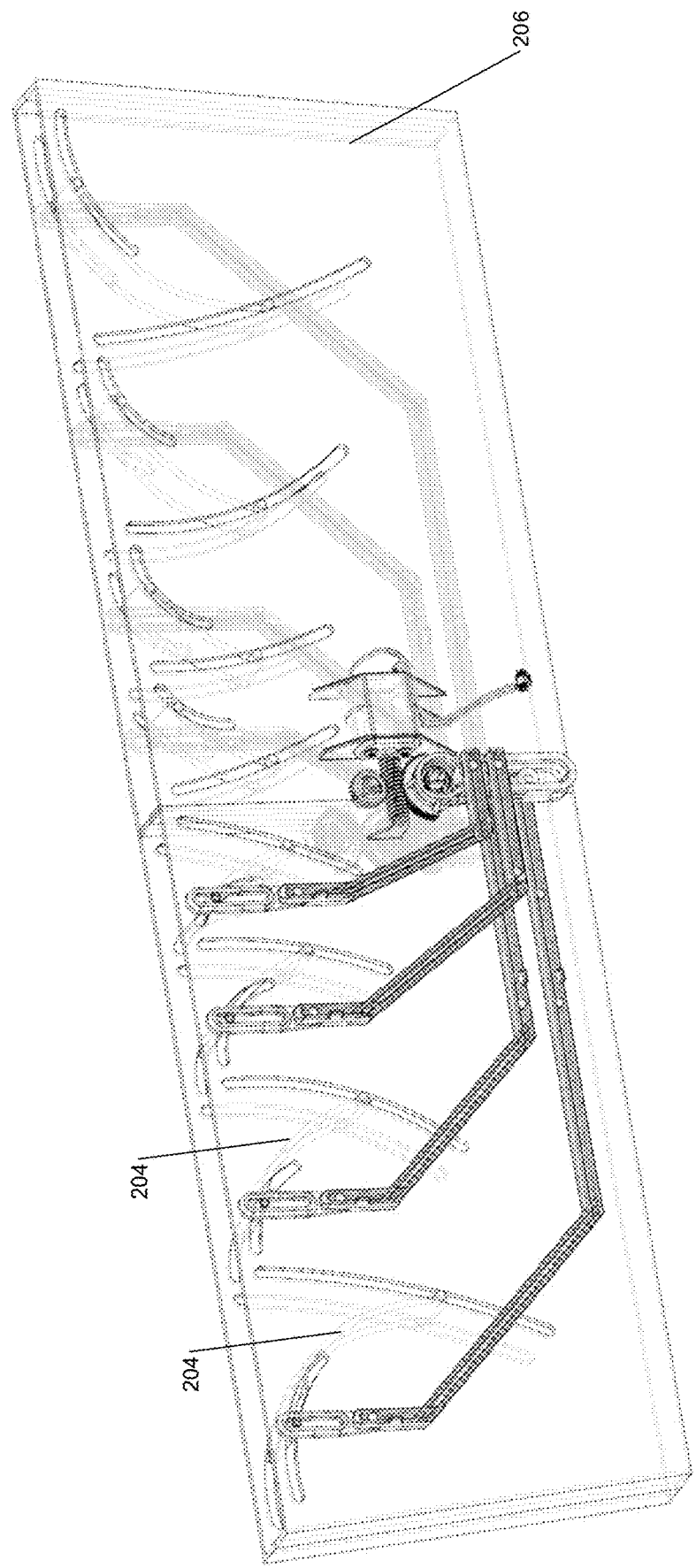
FIG. 11 is a perspective view of the nozzle toward the second side of the housing when the vanes are in the partially open position with components arranged adjacent to the first side of the housing and the vanes shown in phantom.
Figure 12:
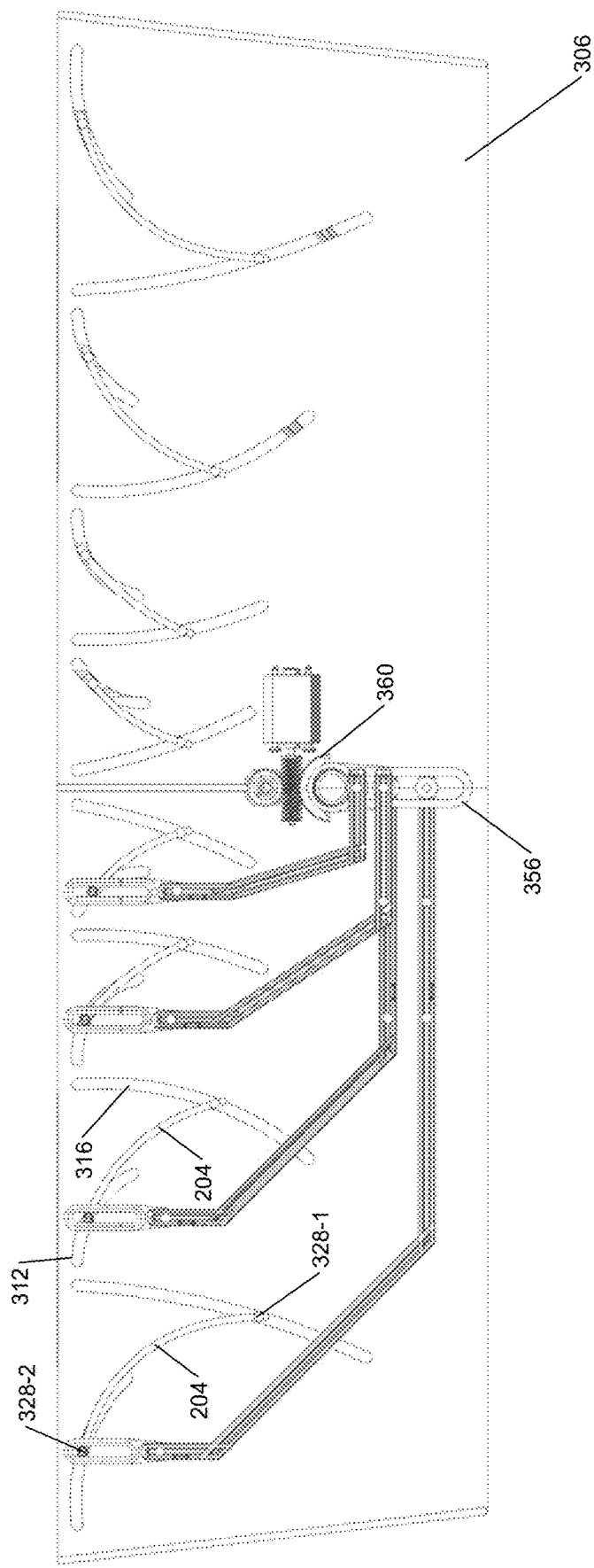
FIG. 12 is another perspective view of the nozzle toward the second side of the housing when the vanes are in the partially open position.
Figure 13:
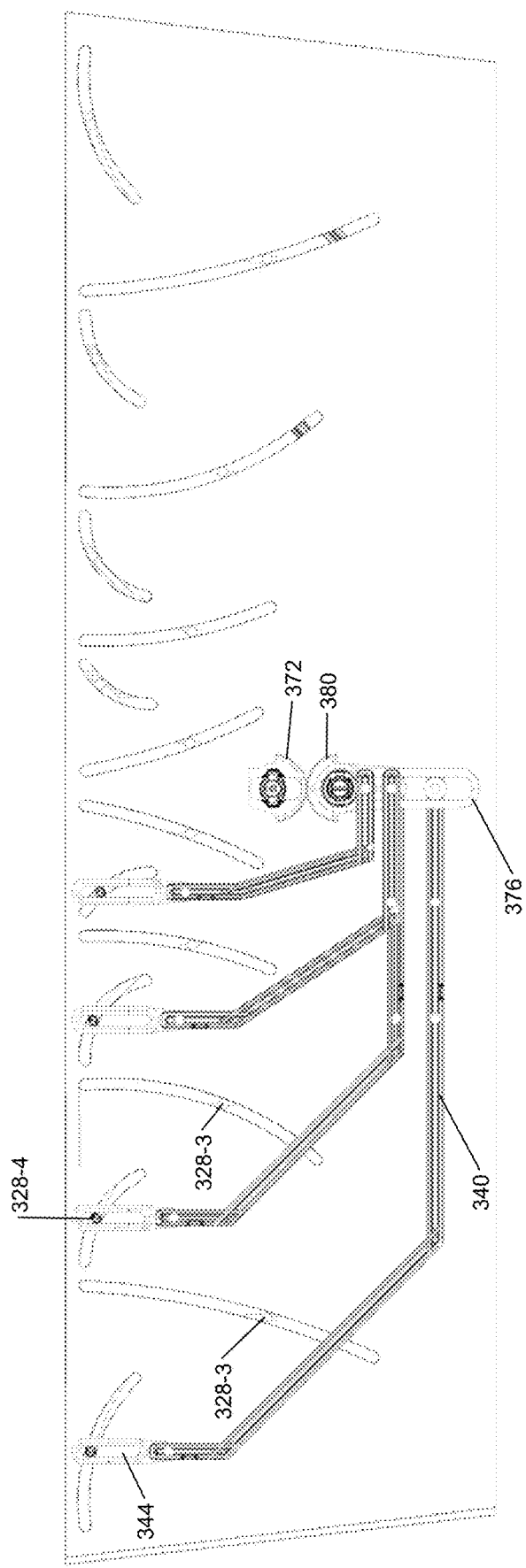
FIG. 13 is a perspective view of the nozzle toward the first side of the housing when the vanes are in the partially open position.
Figure 14:
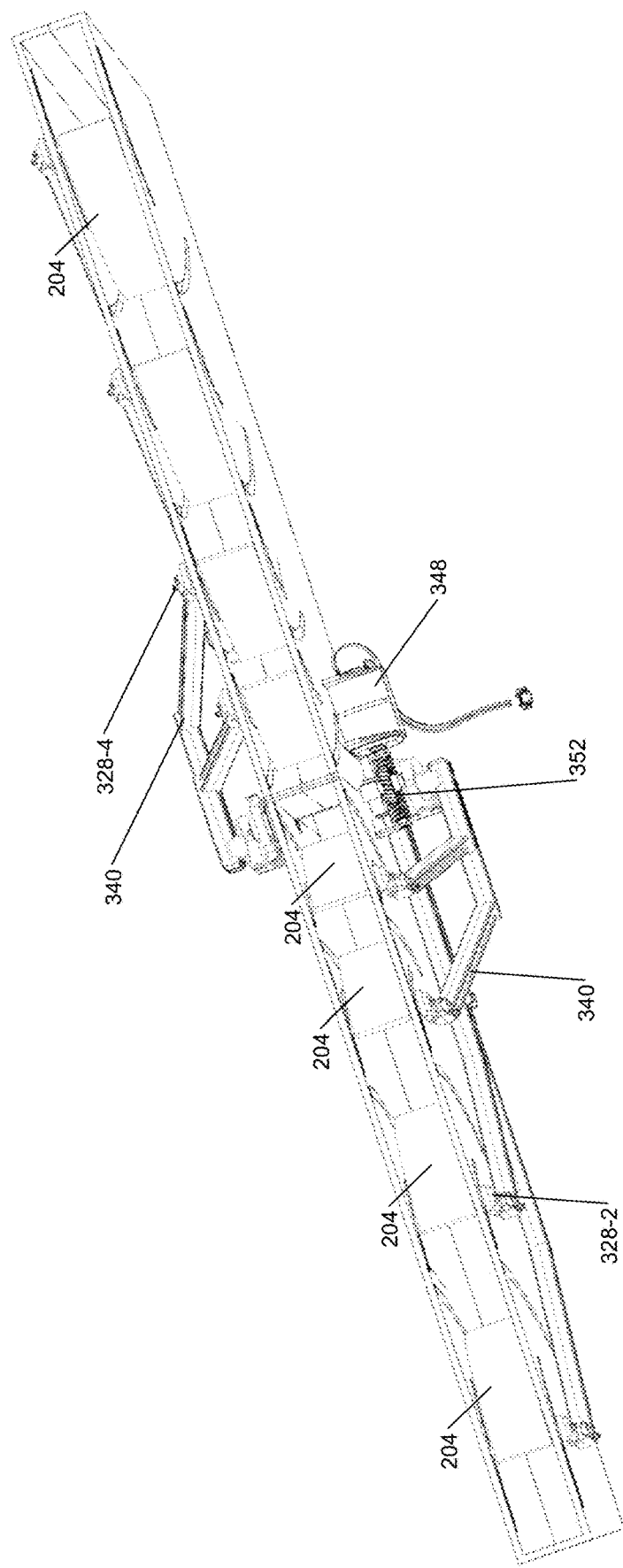
FIG. 14 is a top perspective view of the nozzle when the vanes are in the partially open position.

FIG. 11 is a perspective view of the nozzle 112 toward the second surface 324 of the housing 304 when the vanes 204 are in the partially open position with components arranged adjacent to the first surface 320 of the housing 304 and the vanes 204 shown in phantom. FIG. 12 is another perspective view of the nozzle 112 toward the second surface 306 of the housing 304 when the vanes 204 are in the partially open position. FIG. 13 is a perspective view of the nozzle 112 toward the first surface 320 of the housing 304 when the vanes 204 are in the partially open position. FIG. 14 is a top perspective view of the nozzle 112 when the vanes 204 are in the partially open position.

Figure 15:
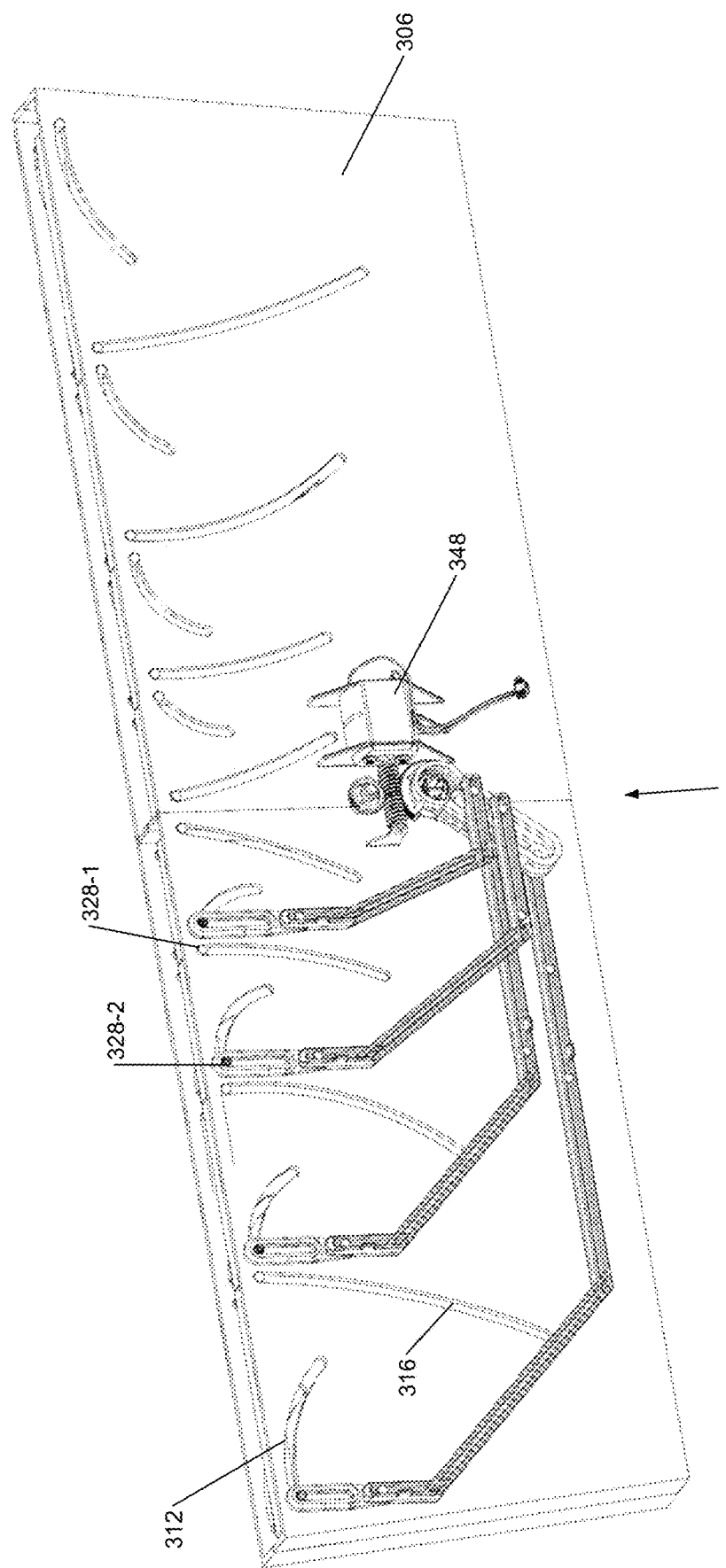
FIG. 15 is a perspective view of the nozzle toward the second side of the housing when the vanes are in a fully closed position.
Figure 16:
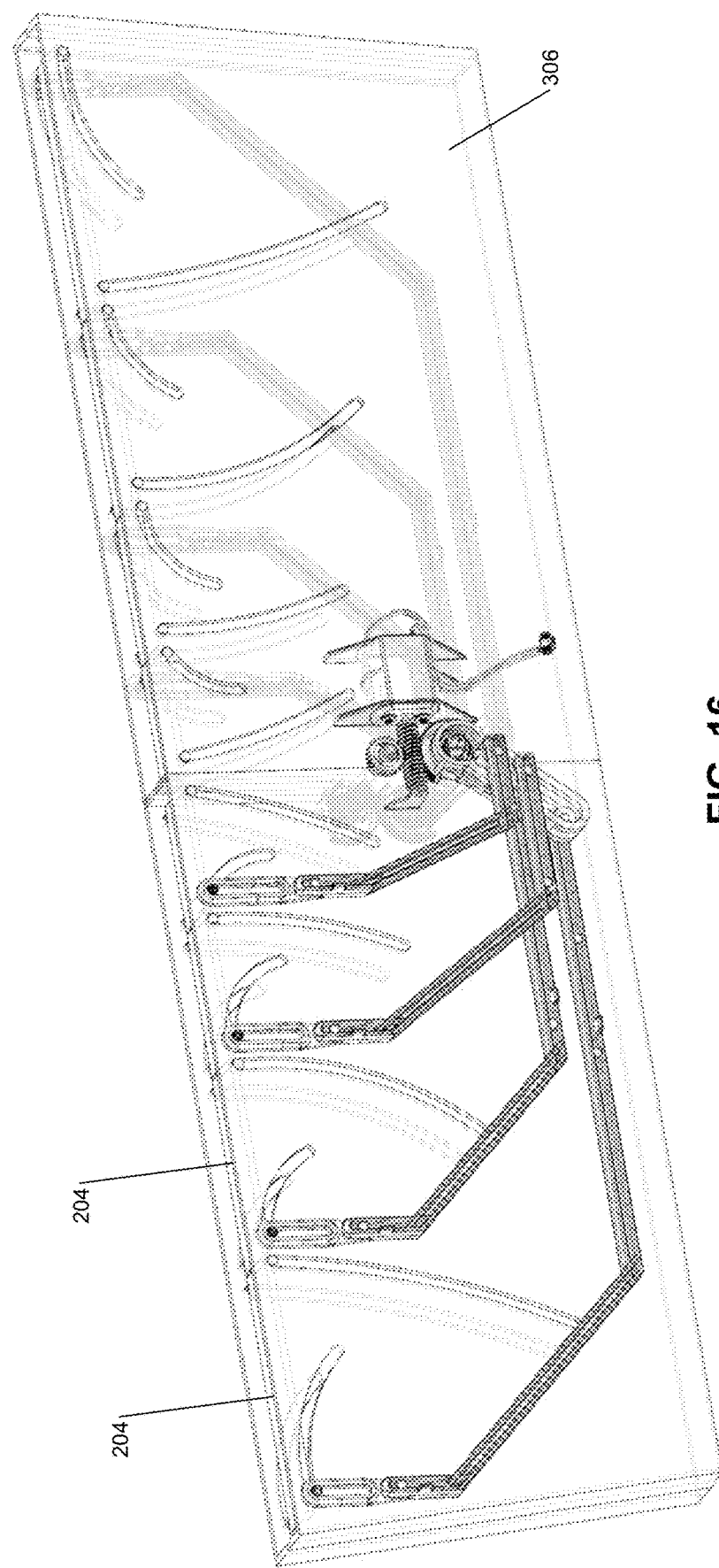
FIG. 16 is a perspective view of the nozzle toward the second side of the housing when the vanes are in the fully closed position with components arranged adjacent to the first side of the housing and the vanes shown in phantom.
Figure 17:
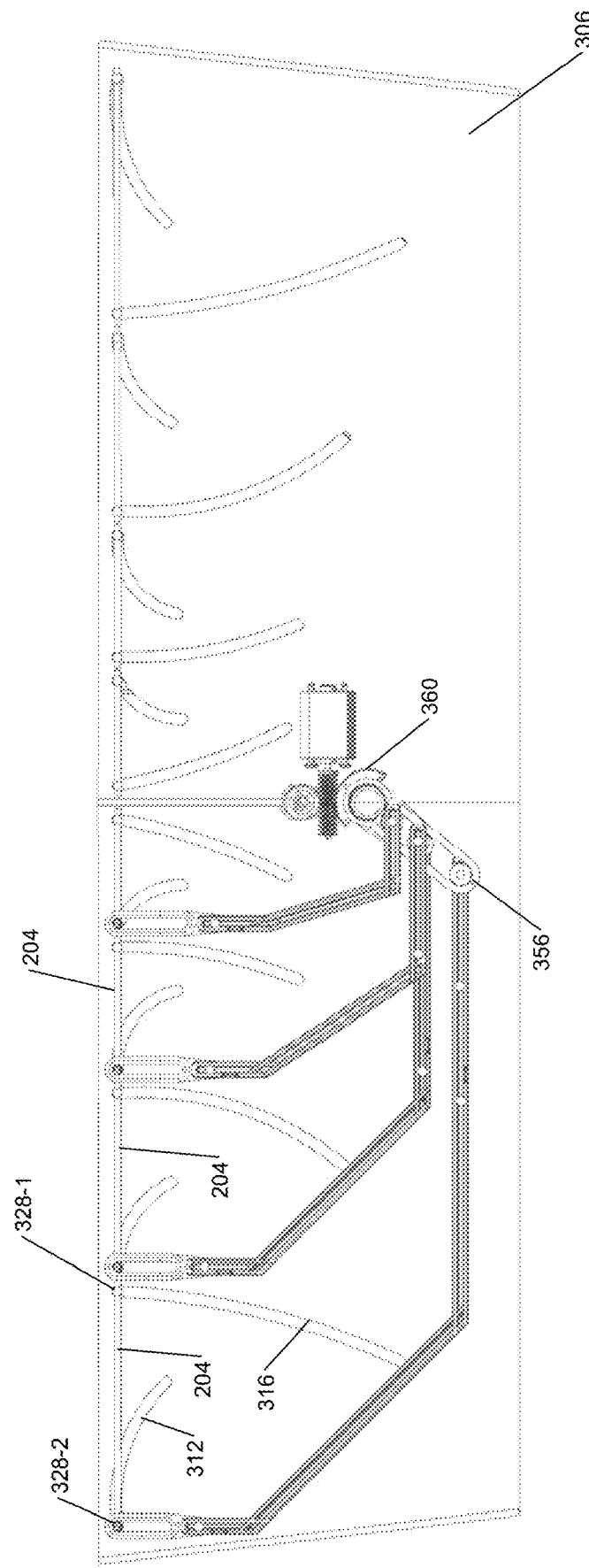
FIG. 17 is another perspective view of the nozzle toward the second side of the housing when the vanes are in the fully closed position.
Figure 18:
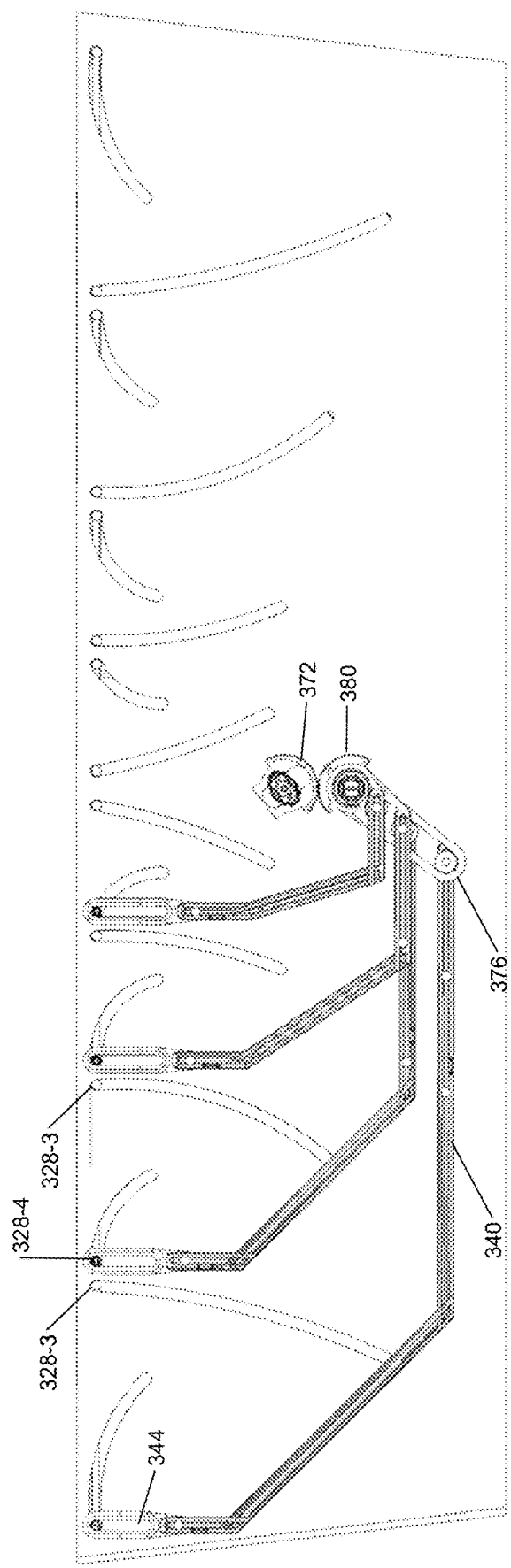
FIG. 18 is a perspective view of the nozzle toward the first side of the housing when the vanes are in the fully closed position.
Figure 19:
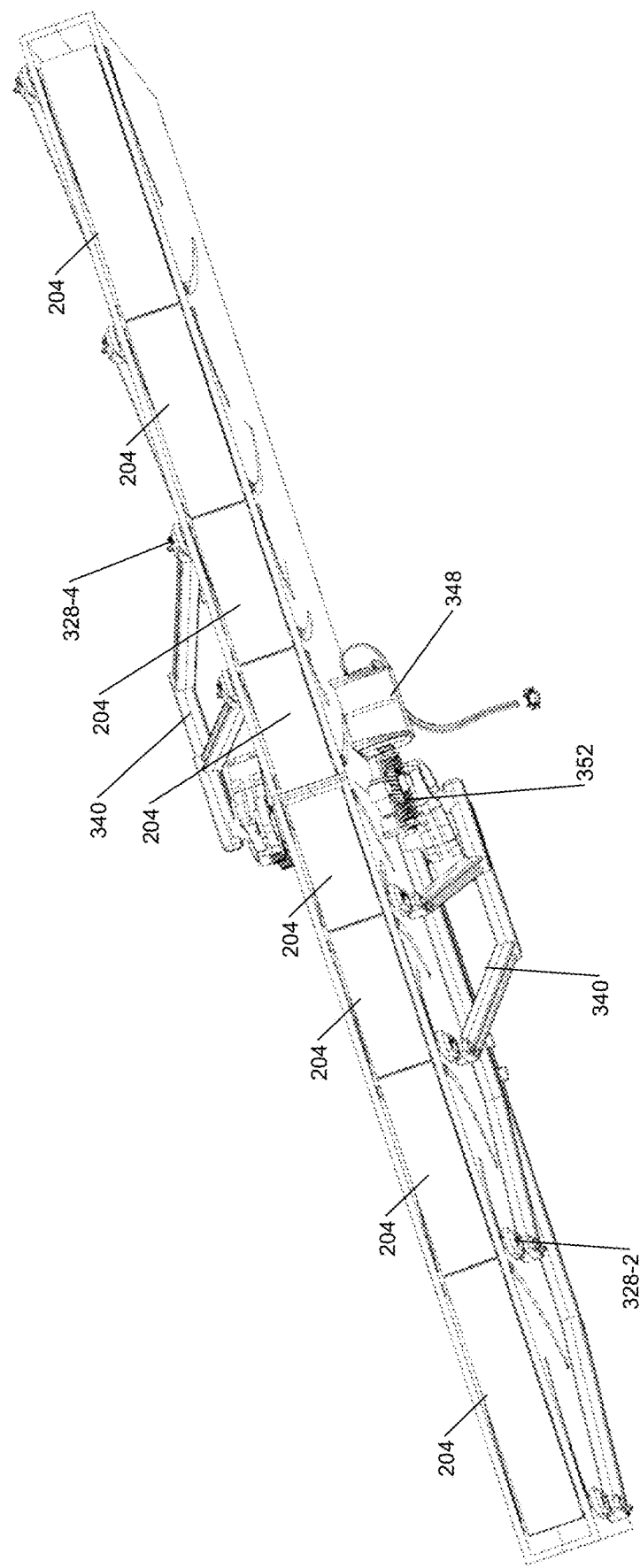
FIG. 19 is a top perspective view of the nozzle when the vanes are in the partially closed position.

FIG. 15 is a perspective view of the nozzle 112 toward the second surface 324 of the housing 304 when the vanes 204 are in a fully closed position. FIG. 16 is a perspective view of the nozzle 112 toward the second surface 324 of the housing 304 when the vanes 204 are in the fully closed position with components arranged adjacent to the first surface 320 of the housing 304 and the vanes 204 shown in phantom. FIG. 17 is another perspective view of the nozzle 112 toward the second surface 324 of the housing 304 when the vanes 204 are in the fully closed position. FIG. 18 is a perspective view of the nozzle 112 toward the first surface 320 of the housing 304 when the vanes 204 are in the fully closed position. FIG. 19 is a top perspective view of the nozzle 112 when the vanes 204 are in the partially closed position. Example airflow directions are illustrated by arrows in various ones of the examples of FIGS. 5-19.

FIG. 20 is a perspective view of the nozzle 112 without the housing 304 looking toward the second surface 324 of the housing 304 when the vanes 204 are in the partially open position. FIG. 21 is a perspective view of the nozzle 112 without the housing 304 looking toward the first surface 320 of the housing 304 when the vanes 204 are in the partially open position.

Figure 22:
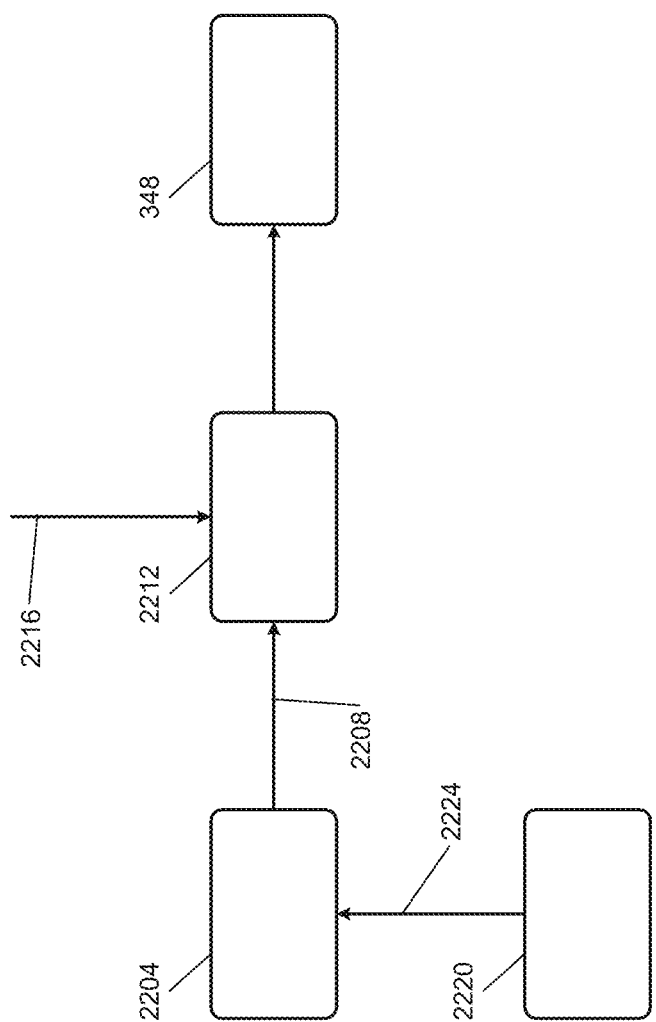
FIG. 22 is a functional block diagram of an example nozzle control system.

FIG. 22 is a functional block diagram of an example nozzle control system. A position module 2204 determines a target position 2208 of the vanes 204 of the nozzle 112, such as the fully open position, the fully closed position, or a position between the fully open and closed positions.

The position module 2204 may determine the target position 2208 based on one or more operating parameters, such as user input regarding defrost/defogging the windshield 116 and/or one or more other operating parameters. For example, the position module 2204 may set the target position 2208 to a predetermined open position in response to receiving user input to defrost/defog the windshield 116. The position module 2204 may also vary the target position 2208 under one or more circumstances, such as to increase a rate of defrosting/defogging of the entire windshield 116. The position module 2204 may set the target position 2208 to the fully closed position, for example, when defrosting/defogging of the windshield 116 has not been requested.

In various implementations, the position module 2204 may oscillate the target position 2208 back and forth between two positions, such as the fully open position and the fully closed position. This may, for example, maximize a rate of defrosting/defogging of the entire windshield 116.

Figure 23:
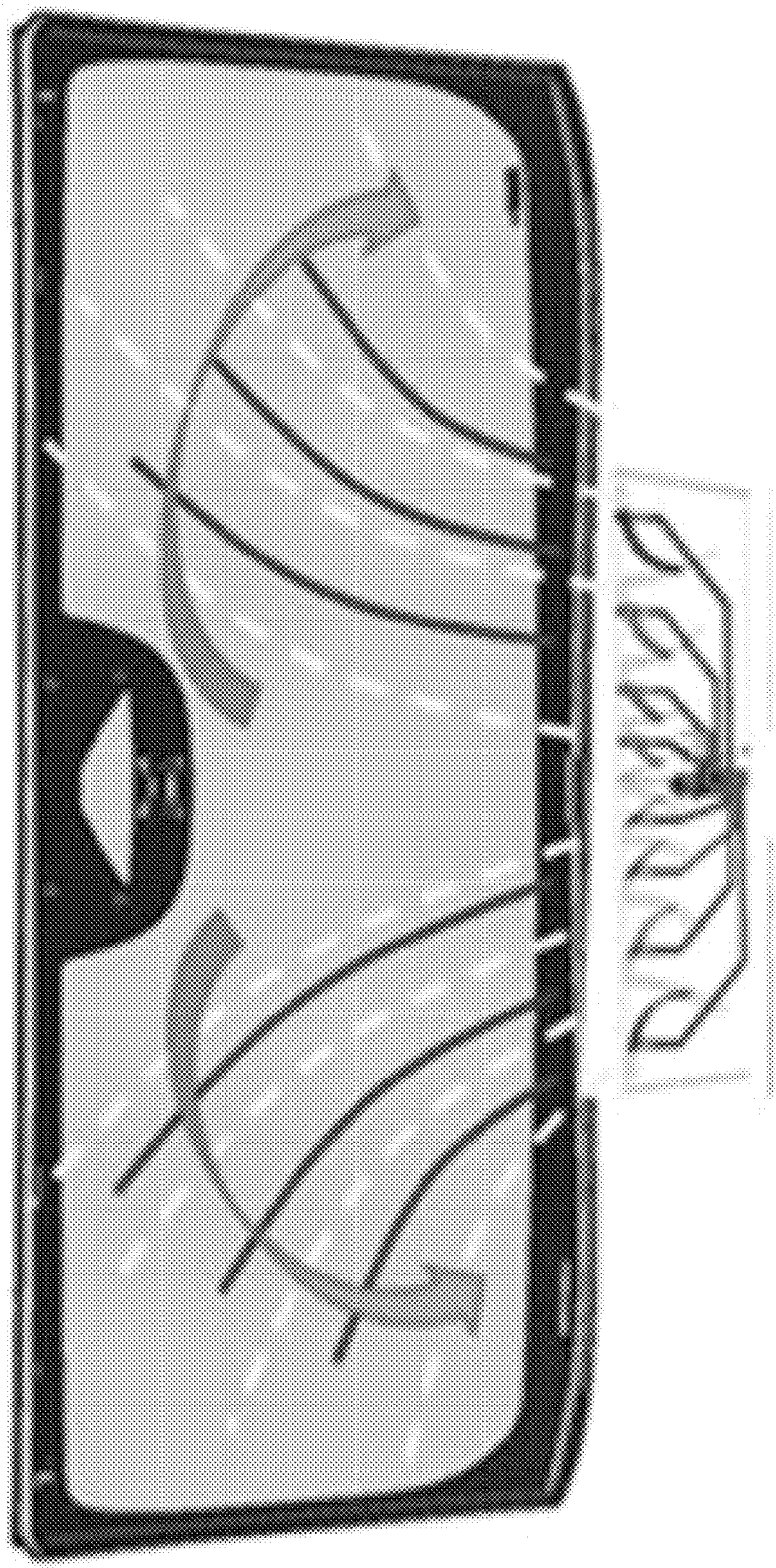
FIG. 23 includes an example illustration of oscillating airflow.

FIG. 23 includes an example illustration of oscillating airflow with airflow during operation in a first position indicated using dashed lines and airflow during operation in a second position indicated using solid lines.

A motor control module 2212 receives electrical power 2216 from a power supply, such as a battery of the vehicle or another suitable power source. The motor control module 2212 applies electrical power to the motor 348 to achieve the target position 2208. This opens or closes the vanes 204 to the target position 2208.

In various implementations, the vehicle may include a windshield monitoring module 2220. The windshield monitoring module 2220 may include one or more devices configured to monitor fog/frost/snow on the windshield 116. For example, the windshield monitoring module 2220 may include one or more cameras having the windshield 116 in a field of view of the camera(s). The windshield monitoring module 2220 may determine a transparent (not humidity, snow, or frost covered) portion (e.g., percentage of the total area) of the windshield 116 based on images from the camera. The windshield monitoring module 2220 may also determine one or more areas where more or some humidity, snow, or frost is present on the windshield 116 relative to other areas where no or less humidity, snow, or frost is present on the windshield 116. The position module 2204 may adjust the target position 2208 based on input 2224 from the windshield monitoring module 2220, such as to direct more air to the one or more areas where more or some humidity, snow, or frost is present on the windshield 116. Additionally or alternatively, the position module 2204 may adjust the target position 2208 based on input 2224 from the windshield 116 to direct less air to the one or more areas where less or no humidity, snow, or frost is present on the windshield 116.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A nozzle to output air onto an interior surface of a windshield of a vehicle, the nozzle comprising:
   a housing including:
     a first surface;
     a second surface that is opposite the first surface;
     a first opening configured to receive air output by a blower; and
     a second opening to output air toward the interior surface of the windshield;
     first and second tracks formed on the first surface;
     third and fourth tracks formed on the second surface;
     fifth and sixth tracks formed on the first surface and spaced apart from the first and second tracks;
     seventh and eighth tracks formed on the second surface and spaced apart from the third and fourth tracks;
   a first vane that includes first, second, third, and fourth extensions,
     wherein the first and second extensions extend into and slide along the first and second tracks, and
     wherein the third and fourth extensions extend into and slide along the third and fourth tracks;
   a second vane that includes fifth, sixth, seventh, and eighth extensions,
     wherein the fifth and sixth extensions extend into and slide along the fifth and sixth tracks, and
     wherein the seventh and eighth extensions extend into and slide along the seventh and eighth tracks; and
   an actuator that is coupled to at least one of the first, second, third, and fourth extensions, and at least one of the fifth, sixth, seventh, and eighth extensions and that is configured to, via moving the at least one of the first, second, third, and fourth extensions and the at least one of the fifth, sixth, seventh, and eighth extensions:
     slide the first and second extensions along the first and second tracks;
     slide the third and fourth extensions along the third and fourth tracks;
     slide the fifth and sixth extensions along the fifth and sixth tracks; and
     slide the seventh and eighth extensions along the seventh and eighth tracks,
     wherein the actuator is configured to slide the first vane in a first direction and the second vane in a second direction that is opposite the first direction.

2. The nozzle of claim 1 wherein each of the first vane and the second vane has a body that is made of a flexible material.

3. The nozzle of claim 1 wherein the actuator is configured to simultaneously move both: (a) the at least one of the first, second, third, and fourth extensions and (b) the at least one of the fifth, sixth, seventh, and eighth extensions.

4. The nozzle of claim 1 wherein a first length of the first vane is different than a second length of the second vane and a first arc length of the first track is different than a fifth arc length of the fifth track, wherein the first extension of the first vane corresponds to the fifth extension of the second vane.

5. The nozzle of claim 1 wherein the actuator includes an electric motor.

6. The nozzle of claim 5 wherein the actuator further includes an arm that is coupled at a first end to the least one of the first, second, third, and fourth extensions,
   wherein the electric motor is configured to move the at least one of the first, second, third, and fourth extensions via moving the arm.

7. The nozzle of claim 6 wherein the actuator further includes a gear and a lever arm including teeth that are meshed with the teeth of the gear,
   wherein the electric motor is configured to drive rotation of the gear and the lever arm, and wherein the lever arm is coupled to a second end of the arm.

8. The nozzle of claim 1 wherein the first vane has a rectangular prism shape.

9. The nozzle of claim 8 wherein the first, second, third, and fourth extensions extend outwardly away from side surfaces of the first vane.

10. The nozzle of claim 1 wherein the first, second, third and fourth tracks are arcuate.

11. The nozzle of claim 1 wherein the housing has a trapezoidal prism shape and an area of the first opening is less than an area of the second opening.

12. The nozzle of claim 1 wherein the first, second, third, and fourth tracks include apertures through the housing.

13. The nozzle of claim 1 wherein the nozzle further includes;
   N additional vanes that are flexible and that each include a set of four extensions, wherein N is an integer greater than or equal to two; and N sets of four tracks, where a first two of each set of four tracks are formed on the second surface and a second two of each set of four tracks are formed on the first surface,
wherein the four extensions of each vane extend into and slide along ones of tracks the set of four tracks of that vane.

14. The nozzle of claim 1 wherein the actuator is configured to selectively:
actuate the first vane and the second vane to a fully open position; and
actuate the first vane and the second vane to a fully closed position, wherein the first vane and the second vane are co-planar and lie on a horizontal plane when in the fully closed position.

15. The nozzle of claim 14 wherein the actuator is configured to selectively actuate the first vane and the second vane to a position between the fully open position and the fully closed position.

16. The nozzle of claim 14 wherein the actuator is configured to selectively actuate the first vane and the second vane to multiple different positions between the fully open position and the fully closed position.

17. The nozzle of claim 1 wherein the actuator is configured to selectively oscillate the first vane back and forth between two positions.

18. The nozzle of claim 1 wherein the vane is configured to:
output air into the interior surface of the windshield in a first direction when the first vane is in a first position;
output air into the interior surface of the windshield in a second direction when the first vane is in a second position; and
output air into the interior surface of the windshield in a third direction when the first vane is in a third position.

19. A nozzle to output air onto an interior surface of a windshield of a vehicle, the nozzle comprising:
a housing including:
a first opening configured to receive air output by a blower;
a second opening to output air toward the interior surface of the windshield;
N sets of tracks formed in the housing, wherein N is an integer greater than 1;
N vanes that are flexible and that each slide along a respective one of the N sets of tracks; and
an actuator that is coupled to each of the N vanes and that is configured to slide along the N vanes along the N sets of tracks, respectively,
wherein the actuator is configured to slide a first one of the N vanes in a first direction and slide a second one of the N vanes in a second direction that is opposite the first direction.

* * * * *